3,059,280
UREA PRILLING
Albert D. Laehder, Memphis, Tenn., assignor to W. R. Grace & Co., New York, N.Y., a corporation of Connecticut
Filed Oct. 27, 1960, Ser. No. 65,524
2 Claims. (Cl. 18—47.2)

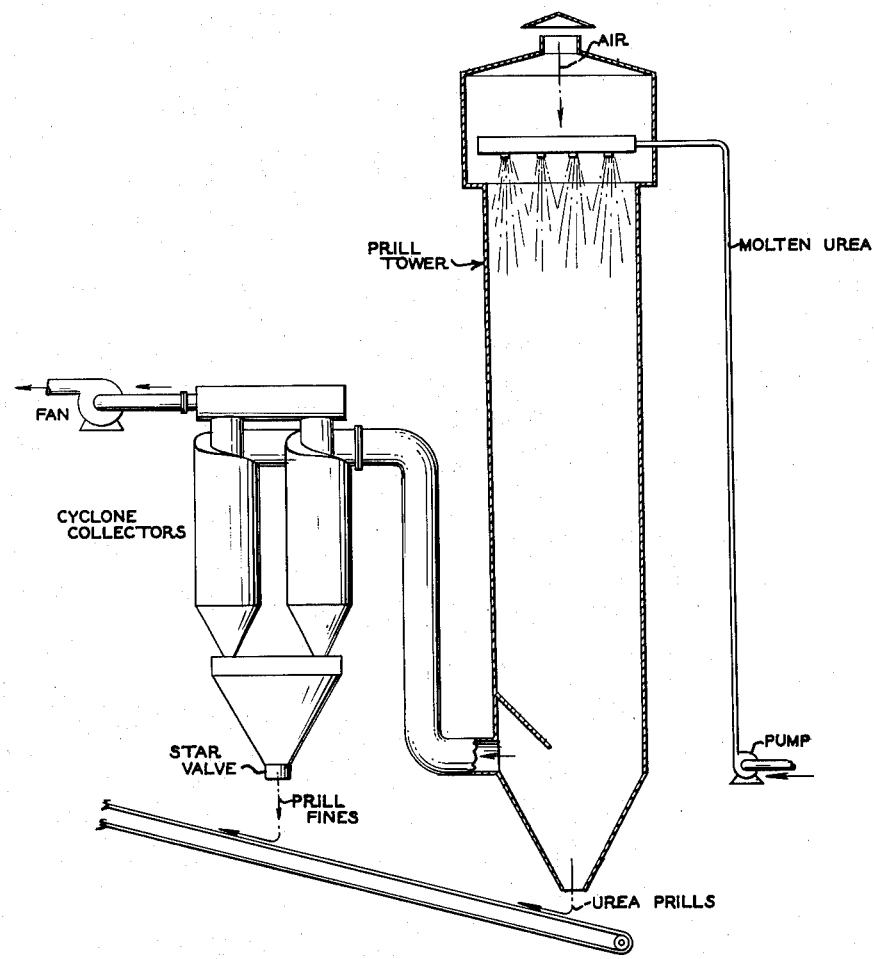

This invention is directed to an improvement in urea prilling comprising conducting the prilling operation in a co-current stream of air (moving downward with the solidifying prills through the prilling tower) and then collecting the prills and substantially all by-product urea dust (fines) at the bottom of the tower.

The drawing is an elevational view of a prilling tower with accessory apparatus for operating the invention.

This invention provides a solution to three troublesome problems attendant to counter-current prilling as used in conventional urea prilling processes, viz., (1) dust losses at the top of the prill tower; (2) product build-up on the walls of the prill tower during the production of smaller size (feed-grade) prills; and (3) heat and fumes at the top of the prill tower (which make inspection and sparger-servicing during operation both hazardous and difficult).

This invention is best understood with respect to modifications it involves in standard commercial urea prilling as it is generally practiced throughout the world today. In this prior art procedure, both fertilizer prills (typically 1340 microns av. diam.) and feed-grade prills (typically 736 microns av. diam.) are produced in the same basic manner. Molten urea (typically 290° F., 0.5–1.5% $H_2O$) is sprayed downward through multi-holed sparger plates at the top of the prill tower (typically 140 ft. high) into a countercurrent stream of air rising through the tower, blown into the bottom of the tower by one or more fans, at ambient atmospheric conditions. Urea droplets are formed which cool and solidify while descending the tower, and leave the bottom as solid spheres or "prills".

My experiments, however, show that some of the smaller particles are entrained in the cooling air stream and are carried out the top of the tower, where they are vented to the atmosphere and lost. My work shows this loss to be a minimum of one ton/day for fertilizer prills. Because of the smaller average product particle size, countercurrent air flow in the prill tower during the production of feed grade prills must be limited to natural draft. The use of forced draft as used in the production of fertilizer prills would result in excessive dust losses. Even so, my research shows a dust loss of 0.5 ton/day even with natural draft, when making feed-grade prills at the rate of 125 tons/day. Reduced air flow (natural draft), however, introduces a problem of its own. Because of insufficient prill cooling during periods of high production or of high ambient temperature, formations of urea are deposited on the walls and on the bottom collecting cone of the prill tower. These formations hamper the operation of the prill tower and frequently force complete shutdowns to remove the deposits. On a hot summer day it is a common experience to be forced to shut down a feed-grade prill run after a few hours' operation at natural draft, to remove these deposits. Also, as a secondary result of low air flow, fumes and excessive temperatures (150° F.–170° F.) at the top of the prill tower make inspection and changeout of the sparger plates very difficult and at times virtually impossible.

When operating the tower for fertilizer prills, the countercurrent air flow is typically 72,000 c.f.m., representing a velocity of 5.7 ft./min. With natural draft (used for feed-grade prills) the air flow is about 43,000 c.f.m., or a velocity of 3.4 ft./min.

Regardless of the prilling system, inspection and "changeout" of the sparger plates located at the top of the prill tower is periodically necesary in order to maintain proper operation. Temperatures in this area with countercurrent air flow frequently run in the neighborhood of 140° F. and have been noted as high as 169° F. during periods of high production (250 T/D). Also, as already mentioned, the presence of ammonia in the atmosphere makes any maintenance difficult, and at times virtually impossible. As a result, with countercurrent air flow, work at the top of the tower, e.g., to replace sparger plates, etc., must be handled in a series of short working periods. The operator enters for short intervals doing as much work each time as possible. Air masks do no good. They either fog up or become crusted with urea until visibility is zero.

In making feed grade prills, production by conventional techniques has been limited by the amount of heat delivered by the prills to the air column within the tower. Not only is forced draft out of the question, but also the natural draft created by warming the air in the column must be limited. Obviously, if the column rises too rapidly, much of the finer fractions of these very small prills will be swept out of the top of the tower into the open atmosphere. In the past, the only means of reducing this loss was to reduce the velocity of the natural draft (by reducing the heat delivered to the air column), and this necessarily required a reduction in the amount of hot molten prills discharged into the air column.

In a rather fundamental respect, the instant invention may be said to upset the previous theory on which commercial urea prilling is based, namely, that countercurrent air is necessary to solidify the prills. According to this theory, the molten prills at the top of the tower pass downward through a decreasing temperature gradient, giving up heat during the fall and at about the same rate as the drop in rate of the air temperature, so that a given prill will, at each point in space during its fall, be exposed to progressively cooler and dryer air. The co-current air stream of the present invention, on the other hand, exposes a prill to air that becomes progressively hotter and wetter during the transit of the prill, thereby providing conditions that the practitioner of the prilling art has heretofore intuitively regarded as highly detrimental. The success of my "inverted" procedure is considered due to two hitherto unappreciated facts, namely, (1) the initial contact of molten prill and cool air at the top of the tower "freezes" the outer surface of the prill, so that, regardless of whether its interior may still be molten or semimolten, it is rendered non-sticky, and does not thereafter stick to the tower wall if it should come in contact with it; and (2) while the co-current air column increases in water vapor content, its relative humidity actually decreases because the temperature increase is greater than the water vapor increase.

Example 1

In a preferred embodiment, to make fertilizer prills, the invention is carried out as follows:

The prilling tower used was 140 feet high by 14.5 ft. square in cross section, with two sparger plates of conventional design, one on each side of the tower. Molten urea (290° F., 1.57% $H_2O$) was delivered to the spargers at a prilling rate of 250 short tons per 24-hour day.

Down draft was provided by two fans at the base of the prill tower, giving a draft of 80,000 cubic feet per minute, equal to an air velocity of 6.35 ft./second.

Under these conditions, urea dust formed at the total rate of 2.94 tons/day, and was collected in eight cyclone collectors (1.47 tons per bank) in two parallel banks of four, as shown in the accompanying drawing. Other methods of collection are of course suitable, e.g., wet impingement. However, for the instant purpose cyclone collectors are preferred because they are efficient and relatively cheap.

The prills left the tower cone at a temperature of 150° F. and analyzed 1% $H_2O$. They were then sent to a rotary dryer operating at 225° F. and finally cooled and bagged. In this connection, a substantial saving in the heat requirements in the rotary dryer was available owing to the relatively high temperature of the prills (150° F. as against 90° F. when using countercurrent draft).

During this run (and all runs herein using co-current draft) the top of the tower was clear of ammonia fumes and dust, the temperature there was ambient, and there was no caking on the tower walls.

My experiments in urea prilling have brought out a paradox, namely, that increasing the prilling rate reduces the rate of formation of fines. The discovery is of immediate advantage in my new system of co-current prilling, especially for the smaller feed grade prills, since it permits a greatly increased production rate, as will be explained.

Now, in making feed-grade prills by the conventional countercurrent draft system, the production rate is limited by the amount of cooling air that can be passed upward through the cooling tower without blowing out excessive amounts of the smaller prills. Even using natural draft (nothing from the fans) the upward air velocity should not exceed about 3.4 ft./sec. My work has shown that this velocity will carry out of the tower all prills and fines smaller than 230 microns. If the draft is increased to 6.7 ft./sec., all prills and fines up to about 400 microns diameter will be carried out the tower and lost to the atmosphere. The latter velocity results in a loss of about 25% of prill material when making feed grade material. To keep losses within commercial limits, therefore, velocities not greater than 3.4 ft./sec. must be used when making feed-grade prills, and such low velocities can be attained only by turning off the fans and utilizing the chimney effect of the tower, which gives a natural draft of about 3.4 ft./sec. when using the heat generated from a feed rate of 182 tons/day in a tower such as that described in Example 1. Greater prilling rates simply result in an excessive amount of incompletely solidified prills.

Even at the rates generally used with natural draft a substantial amount of unsolidified prills is made, and these adhere to the walls of the tower on contact, causing the rapid build-up of urea deposits. On hot days these deposits may form so rapidly as to cause shut down of the tower after a few hours' operation. The only way to remove these deposits is to wash the tower with water, requiring about eight hours. With my co-current draft system the situation is completely different. Using the same prill tower and sparger lines, the production rate for feed grade prills can be increased by 100% or more, with substantially no wall-caking.

The following example illustrates the use of co-current draft at high production rates for feed-grade prills.

Example 2

The same apparatus was used as in Example 1 except that smaller "feed-grade" prills were produced (average diameter 736 microns). The production rate was 238 T/D. The draft used (downdraft, co-current with the falling prills) was 43,500 c.f.m., providing air velocity of 3.45 ft./sec. Ambient air entering the top of the tower had a temperature of 75° F.; relative humidity was 63%. The temperature of the prills leaving the tower was 187° F. Dust was collected at the rate of 0.64 ton/day.

Example 3

In a further run in the same apparatus as in the preceding examples, for fertilizer prills, the production rate was 250 tons/day. On the day of the run, ambient temperature was 67° F. (wet bulb) and 74° F. (dry). Relative humidity of the inlet air was 72%. Co-current air flow was 43,000 c.f.m. Temperature of prills leaving the tower was 208° F. and of the exit air, 142° F. (dry bulb) and 82° F. (wet bulb). Dust formed and recovered was 0.74 ton/day.

Example 4

Using the foregoing apparatus, for fertilizer prills, the production rate was 159 tons/day. Dust made and recovered was 0.15 ton/day. Co-current draft was 44,100 c.f.m. Inlet air temperature (dry bulb) was 62° F. and exit air 108° F. (dry bulb). Temperature of prills leaving the tower was 173° F.

Example 5

One run was made during the rain to demonstrate operability under conditions of 100% humidity. The same apparatus was used as in Example 1. Production rate (for fertilizer prills) was 187 tons/day. Temperature of inlet air (both dry and wet bulb) was 52° F. Co-current draft was 45,000 c.f.m. Dust made and recovered was 1.65 tons/day. Temperature of prills leaving the tower was 101° F.

Example 6

A run was made using the apparatus of Example 1 for feed grade prills, under conditions of 99% humidity. Production rate was 125 tons/day. Inlet air temperature was 52° F. (wet bulb) and 53° F. (dry bulb). Co-current draft was 44,000 c.f.m. Temperature of prills leaving the tower was 101° F. Dust made and recovered was 1.77 tons/day.

Example 7

In another run at 100% ambient relative humidity (in the rain) using the same apparatus as in Example 1, the production rate (fertilizer prills) was 182 tons/day. Inlet air temperature was 62° F. and air leaving the tower 108° F. Co-current air flow was 44,100 c.f.m. The urea feed had a temperature of 290° F. and analyzed 96.89% urea, 1.5% biuret, and 1.57% $H_2O$. Prills leaving the tower had a temperature of 173° F. and analyzed 1.13% water. Although this run was made deliberately under the worst possible humidity conditions, and although the water content of the resultant prills was slightly higher than for conventional countercurrent prills, the prills in this run were indistinguishable from conventional prills as to ease of handling and freedom from caking in the subsequent drying, cooling, and bagging operations. Urea dust was made and collected in this run at the rate of 0.25 ton/day.

Conventional prilling processes generally use urea containing 0.3–3% water, and such urea can be used in the process of this invention, suitably with co-current air velocities of about 3–10 ft./sec. and at production rates up to about 300 tons/day.

While substantially any conventional urea prilling tower may be converted to co-current draft in accordance with this invention ordinarily by reversing the flow of the existing fans and installation of a dust collection system, the invention is by no means limited in scope to such existing systems.

I claim:

1. The process of prilling molten urea, which includes providing an intake for air at ambient conditions at the top of a prilling tower, establishing a downward flow of said intake air within the tower at a velocity not in excess of 10 feet a second by withdrawing the air from adjacent the bottom of the tower, releasing droplets of molten urea into the downflowing air from droplet releasing means located near the top of said tower, withdrawing substantially all of the air and entrained small particles of urea and passing same through a dust recovery system and releasing air to the atmosphere after removal of the entrained particles, recovering urea prills at the bottom of the tower while the prills are at temperatures from about between 100° and 210° F. and subsequently drying the hot prills, whereby conditions at the droplet release level in said tower permit in-process maintenance of the droplet releasing means, and atmospheric pollution by urea dust and fines is prevented.

2. The method according to claim 1 in which the urea droplets are initially at a temperature of about 290° F. and contain 0.3–3% water.

References Cited in the file of this patent

UNITED STATES PATENTS

| | | |
|---|---|---|
| 1,357,206 | Fuller | Oct. 26, 1920 |
| 1,613,334 | Symmes | Jan. 4, 1927 |
| 2,335,922 | Dreyfus | Dec. 7, 1943 |
| 2,402,192 | Williams et al. | June 18, 1946 |
| 2,436,355 | Cadot et al. | Feb. 17, 1948 |
| 2,797,201 | Veatch et al. | June 25, 1957 |
| 2,921,335 | Bowers et al. | Jan. 19, 1960 |